POTENTIOMETERS

Original Filed March 30, 1962 2 Sheets-Sheet 1

INVENTORS
ROBERT L. FERRELL
WILBUR T. HARDISON
BY

POTENTIOMETERS

Original Filed March 30, 1962 2 Sheets-Sheet 2

INVENTORS
ROBERT L. FERRELL
WILBUR T. HARDISON
BY

United States Patent Office

Re. 25,725
Reissued Feb. 9, 1965

25,725
POTENTIOMETERS

Robert L. Ferrell and Wilbur T. Hardison, Riverside, Calif., assignors to Bourns, Inc.

Original No. 3,105,217, dated Sept. 24, 1963, Ser. No. 183,855, Mar. 30, 1962. Application for reissue June 16, 1964, Ser. No. 386,472
19 Claims. (Cl. 338—174)

Matter enclosed in heavy brackets [ ] appears in the original patent but forms no part of this reissue specification; matter printed in italics indicates the additions made by reissue.

This invention pertains to potentiometers, and more particularly to improvements in potentiometers wherein adjustments are effected by rotation of a screw-threaded worm or wormscrew. Examples of potentiometers of the general class to which the invention is directed are illustrated in U.S. Patents Nos. 2,945,198; 2,887,554; and 2,880,293. Such potentiometers comprise an elongate arcuate resistance element disposed around the axis of a rotary contact device that is rotated either directly or through clutch means by a worm wheel that is in turn operated by the adjusting wormscrew.

Potentiometers of the class here of interest include cases or housings of generally square plan-form, or of square shape with one corner beveled for convenience in using flexible-lead terminals; and in general are constructed to utilize an outer or rim portion of the housing for accommodation of mounting-devices such as screws or bolts. In some such instruments a set of through-bores or holes is provided for mounting screws, and in other such instruments a set of indentations around the periphery is provided for reception of wires or other fastening elements. As a consequence of those characteristics, the interior space allotted to the resistance element is restricted so that a resistance element of only relatively small radius can be used. Further, only substantially identical instruments (that is, those with matching mounting holes or grooves and of the same over-all dimensions), can be stacked and mounted in face-to-back relationship.

Additionally it may be noted that in the known prior-art worm-gear adjusted potentiometers certain compromises were necessary to avoid stripping of the teeth of the wormwheel in the event the wormscrew was overrun, that is, rotated beyond prescribed limits. Thus such a potentiometer might on the one hand have a rotary contact that was permitted to be rotated through an indefinite number of revolutions in either direction, that is, no stop means were provided. In that type of device the potential division drops suddenly from a maximum to a minimum or open circuit zero value (or vice versa) incident to continued wormscrew rotation. Such operation, or the possibility of such operation, is in many circuits extremely undesirable. Hence in other prior-art wormscrew-adjusted potentiometers certain stop or movement-restricting means are employed to positively preclude rotation of the rotary contact through a complete revolution. Since the interior mechanism of such potentiometers is not visible to the operator of the device, continued wormscrew rotation during an adjusting operation brings into action the stop means, after which further rotation of the wormscrew in the same direction must result in damage such as stripping of teeth from the wormwheel, unless slip-clutch means are provided. Thus the alternative choice in the compromise has been to provide such clutch means. Provision of such clutch means, usually in the form of plate-like friction means, presents the possibility of the clutch slipping without effective rotation of the rotary contact, thus nullifying the adjustment effort.

The present invention eliminates mounting holes or grooves at or near the outer periphery of the potentiometer, and utilizes for reception of mounting or fastening means, a single hole that is disposed at the center of the potentiometer and extends therethrough from face to back of the instrument. The single mounting hole is preferably and conveniently produced along and around the axis of rotation of the rotary contact and wormwheel, and thus is not only located in a region of little value within the instrument and thus permits use of a much longer resistance element, but the hole is also so located and such that potentiometers of various sizes and capacities can be readily and economically disposed or stacked together and secured in place by the same single mounting screw or rod. In providing the mounting hole, the potentiometer housing is so formed that requisite strength is provided, and electrical isolation and protection is provided for the operating components from foreign matter and the mounting screw or rod. Further, by novel means, the present invention provides for positive limitation of rotation of the rotary contact to a prescribed arc of less than one turn, eliminates the extra means involved in provision of a clutch-device, and concurrently positively avoids possibility of stripping of teeth from a wormwheel. These results the invention attains by utilizing as a wormwheel, a bobbin-shaped wheel having preferably toothless peripheral flanges which press against or grip the thread or screw of the wormscrew and hence cause the wheel to rotate incident to rotation of the wormscrew. The wheel is molded from a resiliently preferably insulative material, with an integral stop, and is formed to engage and directly rotate a conductive contact device that brushes on a collector ring and on the arcuate resistance element. Upon continued rotation of the wormscrew following arrestment of contact rotation by engagement of the stop with an abutment provided in the instrument housing, the wormscrew thread merely slips on the inner surfaces of the flanges. Thus the potentiometer is, functionally, simpler and less complicated and expensive than the prior-art potentiometers having clutch devices, while avoiding the aforementioned undesirable feature of those wormscrew-adjusted potentiometers that do not include clutch means. Additionally, by placing the resistance element adjacent the outer wall of the potentiometer housing, and providing a heat-receptive and heat-transmitting member at the center of the housing, heat-transfer from the potentiometer is greatly improved over that presented by the prior art wormscrew-adjusted potentiometers.

The operating parts of the potentiometer, comprising essentially a resistance element, contact means, wormwheel means and wormscrew means, are disposed in a two-part case or housing that is formed preferably of dielectric material and that is preferably produced by molding procedures well known in the art. One housing part, herein called a cover, is provided with a centrally located tubular portion or member whose interior bore provides the mounting hole for the instrument, and which tubular structure serves to absorb compressive mounting forces and also serves as a shaft upon which a wormscrew-actuated wheel and a rotary electric contact are mounted for rotation. The interior of the housing provides a generally toroidal space in which operating parts are disposed, the resistance element and a collector ring conductor being mounted in or on the base or body part of the housing with terminal means, and the remainder of the operating parts being disposed in the cover part. The two parts of the housing are provided with interfitting portions including outer wall portions through one of which a driving-head portion of the wormscrew is accessible. The two housing parts, with respective components assembled therein, are arranged and adapted to be secured together by adhesive. The adhesive, together with seal means provided for the driving end of the wormscrew, permit the interior of the housing to be sealed to prevent ingress of foreign matter. Preferably the housing parts are of square plan form; however, as will be evident, other housing configurations may be used.

The invention provides for restricting rotation of the movable contact to an arc somewhat less than 360°, that is, less than one full turn; and provides stop means for that purpose which stop means are effective to positively preclude rotation of the contact off either end of the arcuate resistance element. Further, without interposition of clutch means between the wormscrew-driven wheel and the rotary contact, the invention provides means that permit indefinitely continued rotation of the wormscrew in either direction, without harmful results. To the described ends, the invention provides a toothless wormscrew-driven wheel positively connected to the rotary contact to drive the latter, the wheel having a pair of opposed stiffly resilient circumferential flanges similar to those of a pulley and between which flanges a screw-threaded portion of the wormscrew is gripped to provide a yieldable but driving engagement. The wheel is provided with a protuberance or extension which serves as a stop member that is rotatable in either direction into engagement with a cooperative stop or abutment provided on one of the housing parts, whereby rotation of the wheel is positively limited to movement within a predetermined range of rotation. Thus upon continued rotation of the wormscrew in either direction the contact is driven along the resistance element until the protuberance on the wheel is arrested by the abutment, after which occurrence the thread of the wormscrew slips relatively to the flanges of the wheel. Subsequent reverse rotation of the wormscrew causes immediate corresponding rotation of the wheel in the opposite direction. Thus in effect the wormscrew-and-wheel drive is a positive drive until and unless the protuberance on the wheel engages the stop or abutment, and is in effect a slip-clutch drive when the protuberance is being arrested by the stop or abutment.

The preceding brief general description of the invention makes it evident that one principal object of the invention is to provide improvements in wormscrew-adjusted potentiometers.

Another principal object of the invention is to provide simpler and more effective actuating means for wormscrew-adjusted potentiometers.

Another principal object of the invention is to provide more effective and versatile means for mounting wormscrew-adjusted potentiometers.

Another object of the invention is to provide an improved arrangement of parts in a wormscrew-adjusted potentiometer whereby a resistance element of optimum length may be used.

Another object of the invention is to provide a wormscrew-adjusted potentiometer having a simple and inexpensive but very effective wormscrew and wheel arrangement.

An additional object of the invention is to provide for wormscrew-adjusted potentiometers a simple and effective wormsecrew-driven wheel for actuating rotatable driven means of the potentiometer.

Another object is to provide a wormscrew-adjusted potentiometer having greatly improved heat-dissipation characteristics.

Other objects and advantages of the invention will hereinafter be stated or made evident in the appended claims or in the following description of an exemplary potentiometer embodying the invention in a preferred form as illustrated in the accompanying drawings forming a part of this specification. In the drawings:

Figure 1:
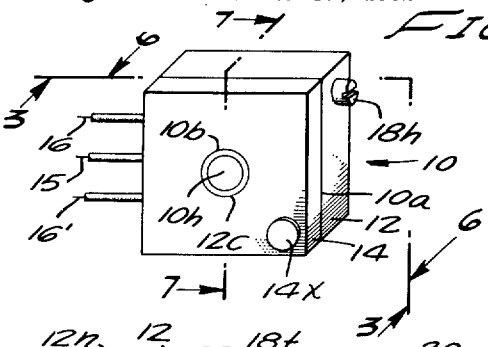
FIGURE 1 is a pictorial view of an exemplary potentiometer incorporating the principles of the invention.

Referring first to FIGURE 1, it may be noted that the potentiometer, designated generally by ordinal 10, is of generally rectangular face form, and preferably of square plan form. The operating components of the potentiometer are enclosed in a housing which preferably comprises two principal members each of which preferably is formed as a single molded part. As shown, the housing includes a cover part 12 and a base or body part 14, which parts have closely interfitting edge portions which permit the parts to be adhesively or otherwise secured together along a zone of juncture 10a and along a juncture or zone of contact 10b. As will be noted more in detail later herein, the potentiometer includes terminals which in the illustrated exemplary embodiment are in the form of flexible wires or leads and which comprise a movable-contact terminal 15 and first and second resistance-element terminals 16 and 16'. Adjustment of electrical potential values between terminal 15 and either of the other terminals is effected by rotation of wormscrew means which comprises a driving head 18h that in the exemplary embodiment protrudes from the housing and is thus accessible for operation. As will be described more fully hereinafter, the cover part 12 has a preferably cylindrical part or portion 12c, the extremity of which extends through and closely fits a hole in body part 14 and may be substantially flush with the surface of the body part as shown. The tubular interior of the portion 12c provides the hole 10h through which a mounting screw or the like may extend, as will presently be made more evident.

Figure 2:
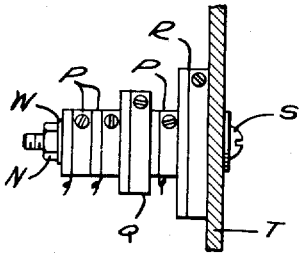
FIGURE 2 is a view illustrating the mounting of a plurality of potentiometers according to the invention, upon a single mounting device.

As is indicated in FIGURE 2, several potentiometers according to the invention, and of the same size or of several sizes, may be supported in face-to-back relationship on a single common fastening or mounting device.

As depicted, three miniature potentiometers P, a small potentiometer Q, and a larger potentiometer R, are all mounted upon a single machine screw S, by which screw and the associated nut N and washer W the potentiometers are secured to one face of a sheet-like panel T. As is evident, the heads of the adjusting wormscrews may all be oriented in the same direction, or otherwise as choice or conditions may dictate. Equally evident is the fact that potentiometers may be disposed in spaced-apart relationship along a common single screw or rod, with spacers, nuts or other clamping means securing the individual potentiometers in their respective positions.

Figure 3:
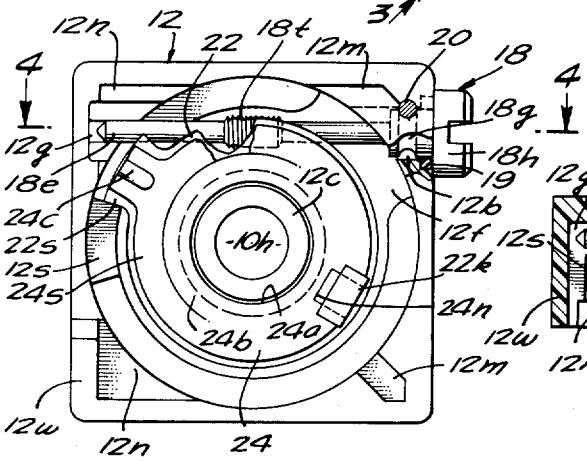
FIGURE 3 is a bottom view of a cover part of the housing of the potentiometer depicted in FIGURE 1, with components supported by the cover in place, and with portions broken away to delineat details of construction.
Figure 4:
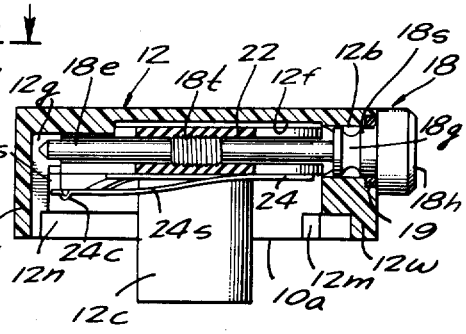
FIGURE 4 is a sectional view of a portion of the potentiometer depicted in FIGURE 1, the view being taken as indicated by line 4—4 in FIGURE 3.
Figure 10:
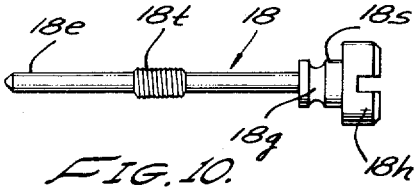
FIGURE 10 is a plan view of a wormscrew comprised in the potentiometer depicted in FIGURE 1.

With attention directed to FIGURES 3 and 4, the cover part 12 is preferably formed as an integrally molded member of dielectric material, having a generally rectangular exterior configuration defined by a floor 12f and side walls such as 12w. As previously noted, the cover part comprises a cylindrical part 12c that is centrally located and perpendicular to the floor 12f, and whose tubular interior provides the mounting hole 10h. Disposed through a suitable bore formed in one wall of part 12 is the wormscrew 18, the inner end 18e of which is disposed for rotation in a groove 12g formed in a buttress provided adjacent one corner of the part. The wormscrew (FIGURES 3, 4 and 10) is provided with a shoulder 18s upon which is received a sealing O-ring 19 (FIGURE 4), which ring is also received in a step-portion of a properly shaped bore 12b formed in the sidewall of part 12. The wormscrew is retained in position with the indicated bearing surfaces thereof seated in the bearings provided by the bore 12b and groove 12g, by a retainer pin 20 (FIGURE 3), which retainer pin is received in a well or bore in cover part 12 as indicated and which is thus disposed in tangential engagement with the wormscrew within a circumferential retainer groove 18g formed adjacent the head of the wormscrew as shown.

Figure 7:
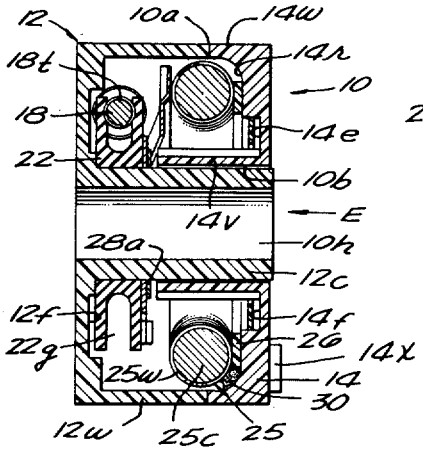
FIGURE 7 is a sectional view of the potentiometer depicted in FIGURE 1, the section being taken on a plane and in the direction indicated by line 7—7 of FIGURE 1.

The wormscrew is adapted to engage and induce rotation of a wheel 22 (FIGURES 3, 4, 7 and 9). To that end the wormscrew 18 comprises a worm or thread 18t that is received between and engages portions of the inner faces of opposed resilient flanges 22f, 22f' of wheel 22, as is indicated in FIGURES 3 and 7. The thread 18t is preferably produced of length such that the end portions thereof both engage the inner faces of the flanges. Thus as illustrated, the thread does not extend beyond the confines of the groove 22g of wheel 22. Further, to provide an effective driving interengagement of the thread 18t with the flanges of wheel 22, the outside effective diameter of the thread is made slightly greater than the perpendicular distance between the inner faces of the flanges, whereby the flanges are, in the vicinity of the zone of interengagement, slightly sprung apart and thus caused to firmly grip the thread. The wheel 22 is thus preferably made of a suitable tough slightly resilient synthetic resin or polymer, of which a material marketed under the trade name "Nylatron® GS" by The Polymer Corporation of Reading, Pa., is eminently suitable. While herein illustrated as comprising two opposed flanges, it is sufficient in certain cases to form the wheel 22 with but a single flange for engagement by the thread of the wormscrew. The wheel in either form may thus be very inexpensively formed by conventional molding procedures. The wheel, as illustrated, is formed to rotate upon tubular part or cylinder 12c as a support, the rotation being induced in either direction by rotation of the wormscrew in a corresponding direction.

Figure 8:
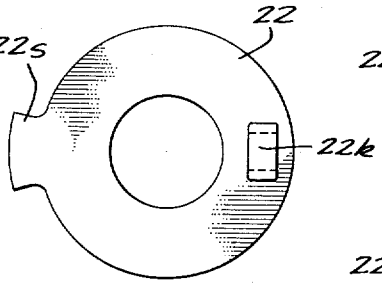
FIGURE 8 is a face view of a wormscrew-driven wheel forming a plural-function component of the potentiometer illustrated in FIGURE 1.
Figure 9:
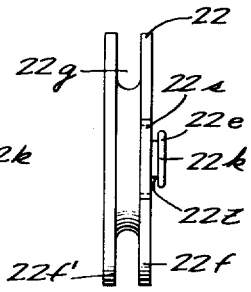
FIGURE 9 is a side view of the component depicted in FIGURE 8.
Figure 14:
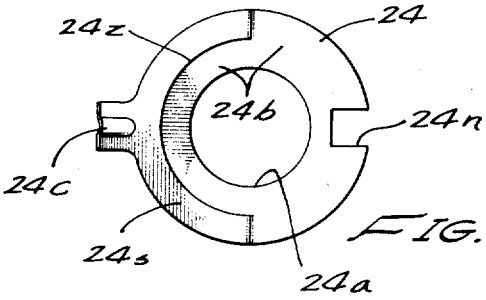
FIGURE 14 is a plan view of a rotary electrical contact device comprised in the potentiometer depicted in FIGURE 1.

Rotation of wheel 22 is directly transferred or translated to a rotatable contact device whose function is to provide electrical interconnection between any selected portion of a contact area of a resistance element, and a conductive collector ring. The contact device 24 (FIGURES 4, 14 and 15) is, for the illustrated exemplary form of the potentiometer, formed by a shearing and stamping operation, from a sheet of resilient conductive material such as one of the commercially-available contact alloys. The preferred contact device, as illustrated, is formed as an integral or single-piece element or part, and has a central opening or aperture 24a of a size to permit closely controlled rotation upon and about cylinder 12c. The contact device, herein termed the contact in the interest of brevity, is provided with a notch 24n in which is received a driving nub or key 22k that is attached to or formed integrally with the body of wheel 22 (FIGURES 8 and 9). As is indicated in FIGURE 3, the opposed horns or edges of the contact at opposite sides of notch 24n are tightly received in respective slots (such as 22z, FIGURE 9) formed by respective overhangs or eaves such as 22e provided as integral parts of the key 22k. The contact is thus readily attached to wheel 22 before the wheel is mounted on cylinder 12c; and when the subassembly comprising the wheel and contact is mounted on the cylinder the contact is constrained to rotate with the wheel. The extent of rotation or angular traverse of the wheel 22 (and consequently also of the contact device 24) is limited by a stop or abutment 12s (FIGURE 3) that is provided in cover 12 preferably as an integral part of the cover, and which abutment is disposed in the path of stop means which comprise one or more extensions or stops 22s (FIGURE 8) each formed as a radial protuberance extending outwardly in the general plane of one of the flanges of the wheel 22. The stop means thus provided on the wheel 22, and the abutment means 12s provided in the cover 12, are so dimensioned that the contact point next to be described may not be driven beyond either end of the resistance element with which it cooperates. Thus those dimensions are related to the angular extent or length of the resistive part of the resistance element.

Figure 15:
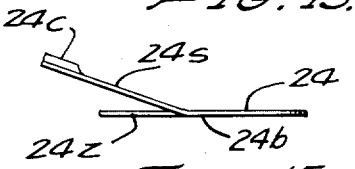
FIGURE 15 is a view in elevation of the device depicted in FIGURE 14.

The contact device 24 (FIGURES 14 and 15) is sheared along an arcuate zone or line 24z, to provide a flat base 24b of 360° extent for supporting contact, or bearing, on wheel 22 and for proper rotational cooperation with the cylinder 12c, and to provide a divergent outwardly extending resilient limb 24s preferably of arcuate configuration integral at its ends with the base 24b. As is illustrated in FIGURE 15, the limb 24s is deformed adjacent its junctures with the base 24b, so as to diverge or extend away from the plane of base 24b, whereby to permit the limb to yield and to exert a force effective to maintain the contact point in effective electrical communication with the resistance element. The contact point, 24c, is provided on a radial extension of limb 24s, either as a pellet of precious metal fusion-united to the limb extension, or, as illustrated, as a protuberance formed by deformation or dimpling of the extension.

Figure 5:
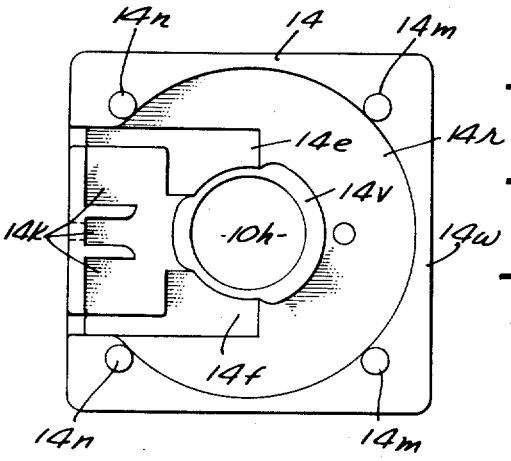
FIGURE 5 is a top view of the base or body part of the housing of the potentiometer depicted in FIGURE 1, illustrating details of the internal configuration of the part.

The cover 12 is provided adjacent its corners with a set of indentations or recesses such as those illustrated at 12m, 12n (FIGURE 3), which recesses are shaped and disposed to receive key-pins such as those illustrated at 14m, 14n (FIGURE 6) formed as upstanding protuberances attached to or formed integral with, housing body 14. The key-pins are thus adapted to precisely position the cover on the body part 14. As is evident from examination of FIGURE 5, the housing body part 14 is formed to provide a trough-like generally annular recess 14r that is partly encircled by an upstanding wall 14w. The recess opens at one side of the body part to provide space for placement of terminal means to be presently described, the wall being modified at that side by provision of outwardly extending channels 14k as indicated. The part 14 also comprises a centrally disposed upstanding circular wall 14v the inside diameter of which is such as to provide a close fit around cylinder 12c of the cover part 12, as is indicated in FIGURE 7. The latter figure makes evident the fact that after the two housing parts are brought into mating contact, they may be adhesively secured and sealed together along the exterior juncture 10a and in the zone between cylinder 12c and wall 14v.

Figure 6:
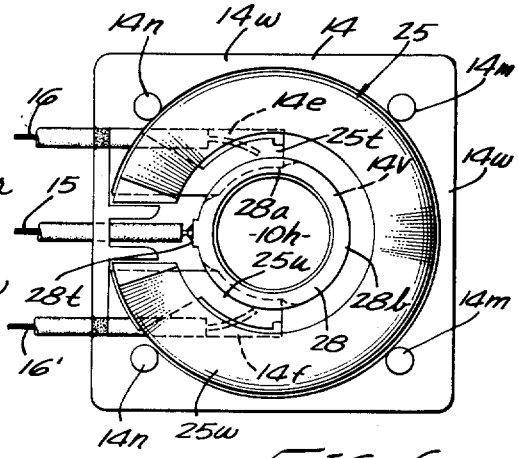
FIGURE 6 is a top view of the base or body part of the housing of the potentiometer depicted in FIGURE 1, with parts supported by the body shown in operating position.
Figure 12:
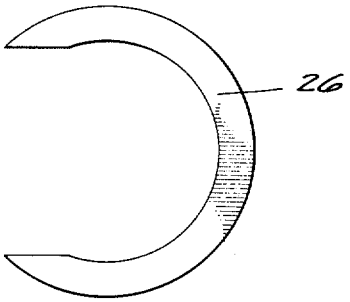
FIGURE 12 is a plan view of an insulator-spacer used in the potentiometer.
Figure 13:
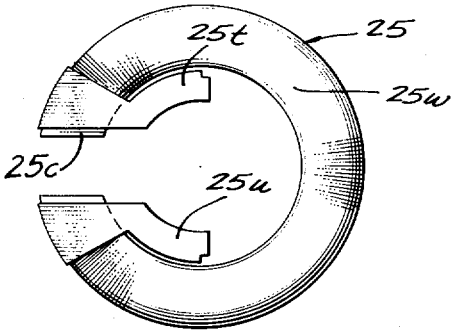
FIGURE 13 is a bottom view of a resistance element comprised in the potentiometer depicted in FIGURE 1, with termination tabs applied, the view being taken in a direction indicated by the arrow E in FIGURE 7.

Disposed in recess 14r, as is indicated in FIGURES 6 and 7, is an arcuate elongate resistance element 25 which in the illustrated exemplary embodiment of a potentiometer is in the configuration of a section of a toroid. The resistance element 25 comprises essentially a mandrel or core 25c upon which is supported a resistive means 25w which in the exemplary embodiment is a coil or winding of resistance wire the convolutions of which are laterally mutually insulated each from the others. The core may be an insulated member of metal, or a member formed of dielectric material such as an insulative ceramic. The resistance element is preferably spaced from the floor of recess 14r by an insulative spacer member 26 (FIGURE 12), so that different types of terminals (flexible, pin in base, or pins horizontal) may be provided. As illustrated, flexible-wire terminals are provided. As is indicated in FIGURE 13, the resistance element 25 has physically secured thereto and electrically connected to respective end portions of the resistive means, first and second termination tabs or strips 25t and 25u that are, in the case of the wire-type resistive means shown, fusion-united with respective end portions of the wire as by brazing or welding. The strips 25t and 25u are disposed below the resistance element in recess 14r, in complementary recesses 14e, 14f formed in the floor of body part 14 (FIGURE 5); and each strip has secured thereto a respective terminal which in the illustrated embodiment is a respective one of wires 16, 16'. By the described means, excellent accurate electrical connections to the ends of the resistance element are provided.

Figure 11:
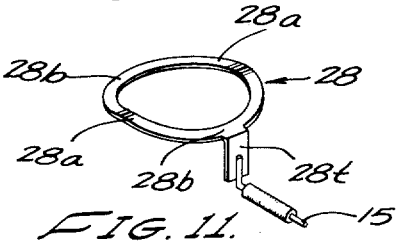
FIGURE 11 is a pictorial view of an electrical collector ring comprised in the potentiometer depicted in FIGURE 1.

Disposed upon the upper substantially circular end face of wall 14v of body part 14, is an exposed conductive resilient collector ring 28 (FIGURE 11). The collector ring is deformed or bowed upwardly so as to present yielding uppermost contact areas 28a, 28a each diametrically opposite the other, and to present two diametrically opposite areas 28b, 28b to rest upon wall 14v. Ring 28 is provided with a terminating means 28t preferably in the form of an integral strip which is formed to depend from the ring and lie against the wall 14v in recess 14r. Means 28t is electrically connected (as by brazing or welding) to a third terminal device, which device in the illustrated embodiment of a potentiometer is wire terminal 15. The latter terminal is disposed in the bottom of one of recesses 14k provided in the floor of part 14, as depicted in FIGURE 6.

Subsequent to assembly of spacer 26, resistance element 25, collector ring 28, and the respective terminal devices, in body part 14, those parts are secured in place by adhesive means such as insulative encapsulating or potting compound only a small portion of which is indicated, at 30 in FIGURE 7. The electrical connections and the element may then be tested as desired. With those parts thus assembled into a body sub-assembly, and the previously described wormscrew, O-ring, wheel, contact device, and retainer pin assembled in cover part 12, adhesive is applied as necessary and the two housing parts are brought together and clamped for curing of the adhesive. Additional compound or adhesive may be applied as necessary to insure complete closure of the open side of body part 14. As the two housing parts are brought together, cylinder 12 is entered into the central opening in body part 14, and one housing part rotated relative to the other (if necessary) to bring key 14m into line with its mating recess, and the parts are pressed together. In that action, contact point 24c engages the exposed surface of the resistive means of the resistance element and points 28a of the ring 28 engage the base 24b of the contact, the spring portions of those elements yielding and providing good contact.

While not essential, the housing parts may be provided with means for facilitating stacking and/or prevention of rotation upon the centrally disposed mounting screw. To that end, properly disposed protruding projections or pins such as 14x (FIGURES 1 and 4) may be provided on one of the housing parts, and complementary sockets (not shown) formed in the other housing part for reception of the pin of a next-adjacent potentiometer. As is evident, a panel may similarly be provided with a hole, or a pin, properly disposed for cooperative action with the opposite member of a mounted potentiometer. As is evident, where such a projection is provided and is not desired in a particular application of the potentiometer, the projection may be easily removed, as by scraping, abrasion or cutting.

As is evident, rotation of the wormscrew 18 (as by a tool applied to head 18h and rotated), first induces rotation of wheel 22 and contact device 24 until engagement of the aforedescribed stop means 22s with abutment 12s occurs, after which any continued rotation of the wormscrew in the same direction merely results in slippage of the screwthread of the wormscrew relative to the flange or flanges of wheel 22. Thereafter, wormscrew rotation in the opposite direction causes immediate reverse rotation of the wheel and contact. Also it is evident that multiple stacking of potentiometers of the same size or of different sizes upon a single mounting screw will not interfere in any way with operation of either of the potentiometers thus mounted. Further, in those cases where pin terminals extending downwardly through the body part are used in lieu of the wire terminals shown in the preferred embodiment (in which case multiple mounting may not be practical and wherein in fact the potentiometer may be mounted by its terminal pins) the advantage of a much larger than usual resistance element still accrues to the disclosed potentiometer. Thus it is evident that the aforementioned objects of the invention are attained.

It further is evident that in the light of the present disclosure in detail of an exemplary potentiometer embodying the invention, changes and modifications will occur to those skilled in the art, and accordingly it is not desired to limit the invention to the particular details of the exemplary structure disclosed, other than as they are specifically defined in the appended claims.

We claim:

1. A wormscrew-adjusted potentiometer comprising:

first means, comprising a box-like housing having first and second principal portions, said housing portions providing opposite generally parallel faces, and structural means providing an unobstructed aperture through the housing from face to face thereof, said structural means being generally tubular in form and comprising a portion providing a cylindrical bearing surface, said first and second principal portions being constructed and arranged to interfit to provide in said housing an interior chamber, and said structural means being rigidly held in place between said faces, whereby said housing has a centrally-located mounting hole therethrough for the reception of mounting means;

second means, comprising adjustable potentiometric means disposed in said housing around said structural means and comprising means mounted for rotation on said cylindrical bearing surface, and said second means comprising terminal means for said potentiometric means;

and third means, comprising wormscrew means supported by said housing and exposed for rotation by means exterior of said housing, said wormscrew means being constructed and arranged with a wormscrew thread in driving engagement with said second means for effecting adjustment thereof in response to rotation of said wormscrew means.

2. A wormscrew-adjusted potentiometer as defined in claim 1, said second means comprising a flanged wheel rotatable on said cylindrical bearing surface and a movable contact rotatable by said wheel, said wheel having flange means engaging the wormscrew thread of said wormscrew means to be driven thereby.

3. A wormscrew-adjusted potentiometer as defined in claim 2, said structural means comprising a tubular member integral with one of said first and second portions, and said wheel being constructed and arranged to rotate upon said tubular portion.

4. In a wormscrew-adjusted potentiometer, first means including potentiometric means including an arcuate resistance element, and means including a rotary contact therefor;

second means, comprising wormscrew means having a screw thread;

third means, comprising a toothless wheel having a circumferential radial flange, an annular substantially flat radial face of which flange presses against said screw thread to be frictionally driven thereby incident to rotation of the wormscrew means, and means connecting said rotary contact to said wheel to be driven by the latter; and fourth means, comprising housing means constructed and arranged to support said first, second and third means.

5. The combination defined by claim 4, said potentiometric means comprising a rotary contact device rotatable by said wheel and further comprising an arcuate resistance element disposed coaxially with said contact device, and said third means comprising a tubular means providing a hole through said housing for reception of mounting means and said tubular means providing bearing means for supporting said toothless flanged wheel and serving to restrain foreign material from entering said housing means.

6. A wormscrew-adjusted potentiometer comprising:

first means, including a hollow box-like housing having upper and lower faces presented respectively by first and second parts of said housing, said first part comprising a floor portion and encircling marginal portions and a centrally-disposed portion including an upstanding tubular portion, and said second part having a portion providing a centrally-located aperture closely encircling said centrally disposed portion of said first part, whereby to provide a mounting-hole for the potentiometer therethrough from face to face;

second means, comprising an arcuate resistance element disposed in said housing and substantially encircling said tubular portion, and first and second terminal means connected to respective ends of said resistance element and each extending through to the exterior of said housing;

third means, comprising a rotatable contact device constructed and arranged to rotate about said tubular portion and having first and second contact portions the first of which is disposed for wiping contact on said resistance element;

fourth means, comprising a conductive collector encircling said tubular portion and arranged to be conductively wiped by said second contact portion, and terminal means connected to said collector and extending to the exterior of said housing; and fifth means, including a rotary wheel disposed for rotation about said tubular portion and engaging said contact device for rotating the latter, and a wormscrew carried by said housing and exposed to the exterior thereof and engaging said rotary wheel for rotating the latter;

whereby said potentiometer or a plurality thereof may be mounted upon and secured in fixed position by a single mounting device extended through the centrally-disposed hole therethrough, and whereby any such potentiometer may be adjusted by rotation of the wormscrew thereof.

7. A potentiometer according to claim 6, said first and second parts of said housing being of substantially square plan form, and said resistance element spanning from wall to wall inside said housing.

8. A potentiometer according to claim 6, said rotary wheel having a peripheral groove and being of pulley-like conformation with opposed rim flanges at least one of which is resilient, and a screw-thread portion of said wormscrew being disposed between said flanges for frictional driving engagement therewith.

9. A potentiometer according to claim 8, said rotary wheel comprising a peripheral protuberance on at least one of said flanges, and said housing comprising an inwardly extending abutment constructed and arranged to be engaged by said abutment to limit rotary movements of said rotary wheel.

10. A potentiometer according to claim 8, said rotary wheel being of resilient dielectric material and having an upstanding anchor on one of said flanges, and said rotatable contact device being of conductive material of generally circular plan form with said first contact point protruding from the periphery thereof and having portions forming a notch engaging said anchor to secure the said contact device to said rotary wheel.

11. A potentiometer according to claim 8, said wormscrew having a thread portion both ends of which engage the inner opposed faces of the rim flanges of said rotary wheel.

12. In a wormscrew-adjusted potentiometer, the combination comprising:

housing means, including first and second housing members of substantially square plan-form and having respective first and second substantially flat parallel faces and having portions defining a centrally disposed aperture therethrough perpendicular to said faces, said housing members being complementary and forming a tubular structure defining at least a part of said aperture and together providing an internal cavity;

wormscrew means including a wormscrew rotatably mounted in said housing means and having a screw portion exposed at the interior of said cavity and having a driving end accessible from the exterior of said housing means;

rotary wheel means in said cavity and mounted for rotation about said tubular structure and engaging said screw portion for rotation incident to rotation of said wormscrew means;

conductive rotary contact means connected to said wheel means for rotation therewith, said contact means comprising inner and outer contact areas electrically interconnected;

resistance element means disposed in said cavity and substantially encircling said tubular structure and having an arcuate exposed area arranged to be wiped by said outer contact area incident to rotation of said rotary wheel means;

conductive collector means substantially encircling said tubular structure and disposed for wiping engagement with said inner contact area of said rotary contact means; and electrical means, including terminal devices attached and connected to respective ends of said resistance element means, and a terminal device connected to said collector means, said terminal means extending from within said cavity to the exterior of said housing means.

13. The combination defined by claim 12, said rotary wheel means being of flat bobbin-shape having outwardly directed peripheral flanges at least one of which is resilient, and said flanges clasping and wormscrew means for driving engagement therewith.

14. The combination defined by claim 13, said rotary wheel means having a peripheral protuberance and said housing having an abutment disposed for coaction with said protuberance to limit rotation of said wheel means when said wheel means is overdriven by said wormscrew means, said wormscrew slipping relative to said wheel means when overdriven with rotation of the said wheel means prevented by said abutment.

15. The combination defined by claim 12, said first housing member having a centrally disposed tubular portion providing said centrally-disposed aperture, and said second housing member having a centrally disposed tubular structure disposed in concentric relation with respect to the said tubular portion, and means adhesively securing said housing members together.

16. The combination defined by claim 12, said resistance element means being secured to said second housing member in said cavity, and said collector being in the form of a flat ring disposed on the end of said tubular structure and substantially concentric with said resistance element.

17. For a potentiometer of the type comprising as functional components an arcuate elongate resistance element, rotatable contact means having a contact in wiping relationship with the resistance element, a screw-threaded shaft, and a rotary element rotatable by the screw-threaded shaft and secured to said contact means for rotating the latter, improvements in housing and supporting means comprising first and second housing members, said first member comprising a floor portion presenting a flat exterior face [and encircling upstanding wall portions integral therewith and a centrally-disposed upstanding tubular portion perpendicular to said face and disposed inwardly from said wall portions, and said second member having a portion providing a flat surface encircling a centrally disposed aperture axially aligned with and closely receiving said tubular portion of said first member, and said second member and said first member being disposed with said faces substantially parallel and having interengaging portions at said wall portions whereby to provide a box-like housing having a centrally-disposed aperture therethrough,] *having a centrally disposed aperture, and said second member comprising a portion providing a flat exterior face disposed generally parallel to the flat exterior face of said first housing member and having a centrally disposed aperture, said first and second housing members comprising portions forming a plurality of exterior wall portions each extending between the respective flat exterior faces of said first and second housing members, and said first and second housing members comprising a generally tubular portion around the respective said apertures and extending between the respective flat exterior faces of said first and second housing members, whereby to form a generally box-like housing having a centrally disposed tubular portion providing a mounting aperture through said housing from one to the other of the said flat exterior faces of the said first and second housing members and providing an enclosed generally toroidal space around said generally tubular portion, and said first and second housing members having interengaging portions*

*to permit sealing of said space against ingress of foreign matter,* and said housing being constructed and arranged to house said functional components, whereby said potentiometer can be mounted and affixed in spatial position on a single rod-like mount.

18. Improvements according to claim 17, said housing members being of substantially square plan form.

19. Potentiometric means comprising:

first means, including housing means presenting first and second opposite faces at least one of which is flat, said housing means including means providing a centrally-located hole therethrough from face to face thereof for reception of a mounting screw or the like, said last-named means comprising generally tubular means around said hole adapted to bear compressive stress applied to said housing means in mounting the latter;

second means, including rotary means including potentiometer contact means and wheel means, disposed for rotation [on] *about* said tubular means in said housing means;

third means, including resistance-element means in said housing means, disposed around said tubular means and spaced radially outwardly therefrom and constructed and arranged to be brushed by said contact means; and fourth means, comprising wormscrew means including a screwthread exposed in said housing in driving engagement with said rotary means, whereby said potentiometric means may be mounted upon a single mounting element and may be adjusted by rotation of said wormscrew means.

References Cited by the Examiner

The following references, cited by the Examiner, are of record in the patented file of this patent or the original patent.

UNITED STATES PATENTS

| | | | |
|---|---|---|---|
| 9,544 | 1/53 | Cook | 74—215 |
| 1,197,349 | 9/16 | Curtis | 211—59 |
| 1,689,348 | 10/28 | Kuhn | 200—11.21 X |
| 2,859,314 | 11/58 | Quint | 338—174 |
| 2,873,340 | 2/59 | Bourns et al. | 338—180 |
| 2,887,554 | 5/59 | Smith et al. | 338—130 X |
| 2,968,015 | 1/61 | Blanco | 338—130 X |
| 3,059,200 | 10/62 | Bamford | 338—148 |

FOREIGN PATENTS

| | | |
|---|---|---|
| 219,122 | 1/62 | Austria. |

RICHARD M. WOOD, *Primary Examiner.*